United States Patent
Delker et al.

(10) Patent No.: US 7,277,547 B1
(45) Date of Patent: Oct. 2, 2007

(54) METHOD FOR AUTOMATED SECURITY CONFIGURATION IN A WIRELESS NETWORK

(75) Inventors: Jason R. Delker, Olathe, KS (US); Robert H. Miller, Leawood, KS (US); Jesse M. Kates, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 822 days.

(21) Appl. No.: 10/279,060

(22) Filed: Oct. 23, 2002

(51) Int. Cl.
*H04K 1/00* (2006.01)
*H04L 9/32* (2006.01)

(52) U.S. Cl. .......................... 380/270; 726/3
(58) Field of Classification Search ................ 380/270; 726/1–7, 14–15, 27; 713/189, 192
See application file for complete search history.

(56) References Cited

U.S. PATENT DOCUMENTS

| | | | |
|---|---|---|---|
| 5,717,688 A | 2/1998 | Belanger et al. | 370/331 |
| 5,729,680 A | 3/1998 | Belanger et al. | 395/200.1 |
| 6,940,392 B2 * | 9/2005 | Chan et al. | 340/10.4 |
| 6,976,071 B1 * | 12/2005 | Donzis et al. | 709/224 |
| 6,990,592 B2 * | 1/2006 | Richmond et al. | 709/226 |
| 7,110,783 B2 * | 9/2006 | Bahl et al. | 455/516 |
| 2003/0139197 A1 * | 7/2003 | Kostic et al. | 455/525 |

OTHER PUBLICATIONS

Internet Engineering Task Force ("IETF") Request for Comments ("RFCs") 2401, "Security Architecture for the Internet Protocol," S. Kent, Nov. 1998.
Internet Engineering Task Force ("IETF") Request for Comments ("RFCs") 2402, "IP Authentication Header," S. Kent, Nov. 1998.
Internet Engineering Task Force ("IETF") Request for Comments ("RFCs") 2406, "IP Encapsulating Security Payload (ESP)," S. Kent, Nov. 1998.
Internet Engineering Task Force ("IETF") Request for Comments ("RFCs") 2407, "The Internet IP Security Domain of Interpretation for ISAKMP," D. Piper, Nov. 1998.
Internet Engineering Task Force ("IETF") Request for Comments ("RFCs") 2408, "Internet Security Association and Key Management Protocol (ISAKMP)," D. Maughan, Nov. 1998.
Internet Engineering Task Force ("IETF") Request for Comments ("RFCs") 2409, "The Internet Key Exchange (IKE)," D. Harkins, Nov. 1998.
Internet Engineering Task Force ("IETF") Request for Comments ("RFCs") 2412, "The Oakley Key Determination Protocol," H. Orman, Nov. 1998.

* cited by examiner

Primary Examiner—Hosuk Song (57) ABSTRACT

A device in a wireless network may negotiate security parameters with an access point for the wireless network. The device and the access point may negotiate the security parameters using low power signals. The device and the access point may subsequently use the security parameters to implement security features, and they may communicate using normal power signals.

32 Claims, 9 Drawing Sheets

METHOD FOR AUTOMATED SECURITY CONFIGURATION IN A WIRELESS NETWORK

FIELD OF THE INVENTION

The present invention relates generally to wireless networks. More specifically, it relates to configuration of security features in wireless local area networks.

BACKGROUND OF THE INVENTION

As is increasingly common, one or more devices may wirelessly connect to a wireless local area network ("WLAN"). For example, a device may communicate over an air interface with an access point. The access point may in turn provide connectivity to one or more other networks, such as an intranet or the Internet. Using the connectivity provided by the access point, the device on the WLAN may communicate with a device on another network or with another device on the WLAN.

WLANs may be used in a variety of different environments, such as a home, office or other types of settings. By configuring a WLAN with one or more access points, devices may wirelessly connect to the WLAN from a variety of different physical locations. Thus, any device in range of one of the access points may potentially join the WLAN. While this may allow authorized users of the WLAN to conveniently connect to the WLAN, it may also allow unauthorized users to connect to the WLAN.

In order to limit access to a WLAN, the WLAN may use a unique identifier. Access points and devices that have the unique identifier can join the WLAN, while device and access point that don't have the unique identifier are not allowed access to the WLAN. By using a different identifier for each WLAN, a device would not be able to join a WLAN simply by being in range of an access point. The device would need to know the WLAN's particular identifier.

A device that does not currently know a WLAN's identifier, however, may still gain access to the WLAN by obtaining the identifier. This may be done, for example, by intercepting packets from one or more other devices communicating with an access point on the WLAN and extracting the identifier from those packets. Sometimes called sniffing, this process may allow a device to maliciously gain access to the WLAN. In order to minimize this type of unauthorized access, as well as other types of unauthorized access, the WLAN may employ various different security features.

One method of providing additional security is through using encryption. WLANs may use a variety of different encryption standards, such as Wired Equivalent Privacy ("WEP") encryption. By using a key to encrypt packets traveling between the access points and devices, a malicious device would first need to obtain the key before decrypting packets, for example, to obtain the underlying data in the packet. Additionally, even if the malicious device obtained the identifier, it may still need to know the encryption key in order to communicate with the access point and connect to the WLAN.

In order to implement encryption, both the access points and the wireless devices must be configured for the particular type of encryption and the keys. Configuring these features may be a difficult process, requiring both access to the access points and the devices, and also requiring a working knowledge of how to reconfigure the access points and devices. Using encryption additionally restricts the movement of a device between WLANs, as the device must be reconfigured for the security features of each different WLAN. These problems, however, are not limited to encryption, but are common to the various different security features employed by WLANs.

Therefore, there exists a need to provide an improved method for implementing security features in a wireless network.

SUMMARY OF THE INVENTION

A device may negotiate security parameters with an access point for a wireless network. The device and the access point may receive an indication to negotiate the security parameters. The device and the access point may then negotiate the security parameters, and they may negotiate the security parameters using low power signals.

The device and the access point may negotiate a variety of different security parameters, for example, encryption keys. Once the device and the access point have negotiated the security parameters, they may automatically configure themselves to use the security parameters. Then, they may communicate using normal power signals, and they may also use the security parameters to protect the normal power signals from being intercepted and decoded by another device. The normal power signals may have a range that is greater than the low power signals.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Architecture

A wireless local area network ("WLAN") may be used to network one or more devices. In a WLAN, the devices may communicate with one or more access points over an air interface. An access point may in turn connect to one or more other networks, such as an intranet or the Internet. Once connected to the WLAN via an access point, a device may communicate with another device on the LAN or with another device on one of the other networks.

WLANs are used in a variety of different environments. For example, WLANs may be used to network devices in a home, office or other setting. One or more access points may be placed throughout the network area, thereby allowing devices to connect to the WLAN from a variety of different physical locations. Once connected to the network, a device may move physical locations while still maintaining communication with one of the access points.

While this may allow authorized users to conveniently connect to the WLAN from a variety of different physical locations it may also allow an unauthorized user to connect to the WLAN. For example, while the WLAN may be confined to a physical location, such as a home or office, wireless signals sent to and from the access points are not necessarily confined to the same physical location. Thus, wireless signals sent to or from access points in the WLAN may travel outside the home or office, thereby potentially allowing a device outside the home or office to wirelessly communicate with an access point located inside the home or office.

Additionally, a WLAN may be implemented outside a confined physical location, such as by configuring the WLAN outdoors. Alternatively, a WLAN may be located partially within a confined location and partially outside a confined location. When the WLAN is implemented fully or partially outside a confined location, such as outdoors, unauthorized users may more easily get within range of the access point, thereby potentially allowing the malicious device to gain access to the WLAN.

In order to restrict access to the WLAN, a WLAN may use a unique identifier. An access point may first require a device to first provide the unique identifier before granting the device access to the WLAN. As the WLAN uses an identifier that is different from other WLANs, it is not enough that the device is within range of the WLAN's access points—the device must also have the unique identifier.

A malicious device attempting to gain unauthorized access to the WLAN, however, may obtain the unique identifier. For example, the malicious device may intercept a packet traveling over the WLAN. Once the malicious device obtains the packet, the malicious device may extract the unique identifier from the packet and then use the unique identifier to gain access to the WLAN.

In order to prevent a malicious device from intercepting packets, obtaining the unique identifier and then accessing the WLAN, the WLAN may implement one or more different security features. The access point may use the same or different security features for its various device, and each device may use one or more different security features. For example, the WLAN may use encryption to encrypt packets traveling between the access points and its devices. By encrypting packets traveling between the access point and its devices, a malicious device would first need to obtain the encryption key before being able to decrypt the packet and obtaining the underlying data. Additionally, as the access point uses encryption, the malicious device would also need to use encryption to successfully communicate with the access point. So, even if the malicious device obtained the unique identifier for the access point, it would still need the encryption key in order to communicate with the access point and join the WLAN.

Other security features may also be used, and they may be used in conjunction with encryption or as alternatives to encryption. For example, access controls lists may also be used to limit access to a WLAN. In this type of security measure, the access point keeps a list, sometimes called an access control list, of unique medium access control ("MAC") addresses for network interface cards ("NICs") of various devices. The list, however, is not limited to storing MAC addresses for NICs, but it may store other types of identifiers. When the access point receives a request from a device to connect to the WLAN, the access point examines the MAC address of the device's NIC. If the MAC address is in the access point's list, then the access point allows the device to connect to the WLAN, otherwise the device is denied access to the WLAN.

In another type of security feature, the access point may create a secure tunnel between the access point and a device, such as can be done in a virtual private network ("VPN"). The tunnel may optionally use other security features, such as the Internet Protocol Security Protocol ("IPSec"), to provide additional security for packets traveling between the device and the access point. Of course, these security features are not an exhaustive list, and many others may be also be used.

One disadvantage of using these security features, however, is the access point and its devices must be configured to support the security features. For example, when using encryption both the access point and the devices must both be configured to use the same encryption protocol. Additionally, the access point and the devices must be configured with the same encryption key. Any subsequent changes to the encryption protocol or the key would then have to be made to the access point and the devices.

Properly configuring the access points and the devices, however, may be a difficult-process that is not easily performed by the average WLAN user. For example, configuring the WLAN to use security features requires reconfiguring both the access points and the devices; however, WLAN users are generally not allowed to access and reconfigure the access points. This type of access is ordinarily limited to a network administrator. Even if the user was allowed to reconfigure the access points, or also where the user was merely reconfiguring a device to conform to already-configured access points, the user must still have the technical expertise to correctly perform the reconfiguration.

Another disadvantage with the configuration of these security features is that it decreases the mobility of the devices. As a device moves from one WLAN to another WLAN, the device may have to be reconfigured for the different security features of the new WLAN. This may require the user to reconfigure the device, and it may also require a network administrator to reconfigure the WLAN's access points. When the WLAN subsequently moves to another WLAN, it may again have to be reconfigured for the new WLAN's security features. Oftentimes configuration and reconfiguration of the security features is a complicated process, thereby causing users and network administrators to foregoing implementing security for the WLAN.

WLAN security features may be more easily configured, however, using automated security configuration. In automated security configuration, an access point and a device may automatically negotiate security parameters, such as for one or more security features that may then be used when the device connects to the WLAN. For example, in response to an indication from a user, the device and the access point may automatically negotiate security features and also automatically configure the device and the access point to use these features, thereby potentially reducing the difficulty ordinarily associated with manually configuring security features.

In order to prevent a malicious device from sniffing the security parameters as the device and the access point negotiate them, the device and the access point may negotiate the security parameters using low power wireless signals. For example, the device and the access point may be in close proximity to each other, and they may negotiate the security parameters using low power signals that have a limited range. The limited range of the low power signals reduces the possibility of a malicious device intercepting the signals and determining the security parameters, because the malicious device would also need to be in close proximity to the device and the access point.

Once the access point and the device have negotiated the security parameters, they may then communicate using normal power signals that have a greater range than the low power signals. Although the malicious device may intercept the normal powered signals and potentially obtain the WLAN's identifier, it would still not have the security parameters necessary to circumvent the security features in order to decode the underlying data or to communicate with the access point. Thus, automated security configuration provides a convenient way to negotiate and configure security parameters. At the same time, automated security configuration at low power levels dramatically reduces the risk that a malicious device would intercept the packets during the negotiation procedure and obtain the security parameters that would allow it to circumvent the security features subsequently used for communication between the access point and the device.

Among other advantages, automated security configuration increases the ease with which a device may move among different WLANs and still use various different security features. For example, a device may use automated security configuration to negotiate security parameters with an access point on a first WLAN, and the device may automatically configure itself to use those parameters. This may reduce the user's involvement to simply bringing the device within range of the access point and initiating the automated security configuration.

Then, the user may move the device within range of a second access point on a different WLAN. The user may again invoke automated security configuration to negotiate different security parameters to be used when communicating with the second access point on the new WLAN. Again, the user simply brings the device within range of the second access point and invokes the automated security configuration process. The access point and the device negotiate the different security parameters and then automatically update their configurations. This allows the device to use the security features on the new WLAN without requiring the user to have advanced knowledge of the particular security features and parameters and without requiring the use to manually update the device's configuration to support the new security features and parameters.

Figure 1:
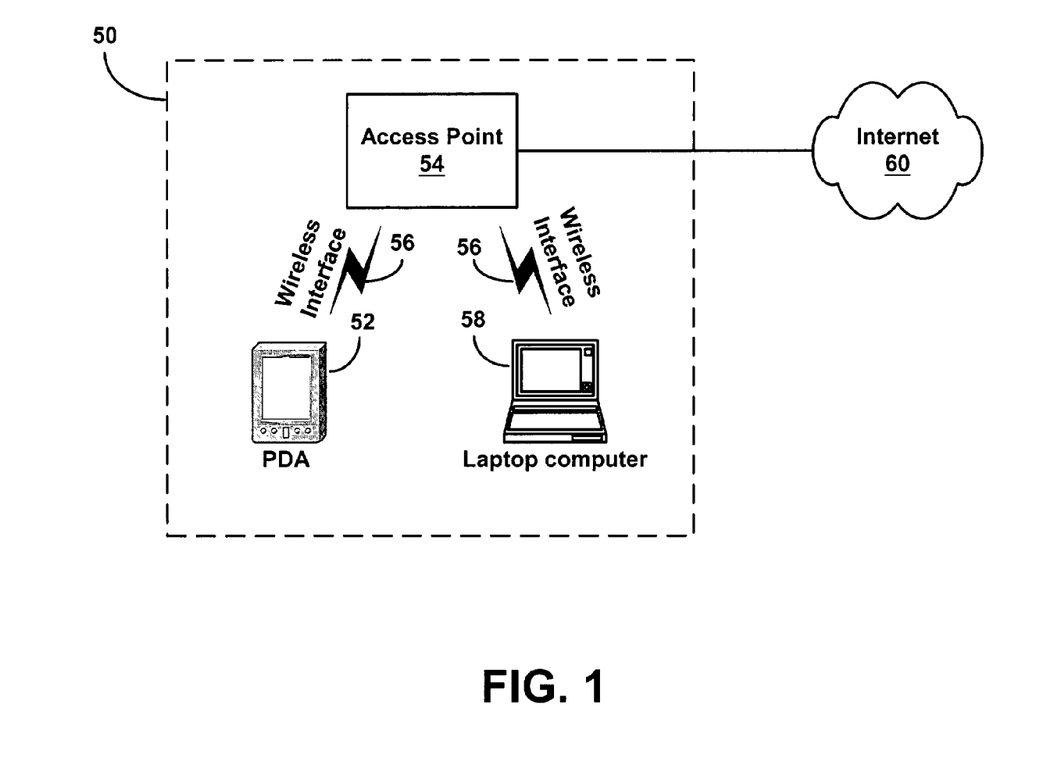
FIG. 1 shows an exemplary WLAN configuration that uses automated security configuration to negotiate security parameters between a device and an access point.

FIG. 1 shows an exemplary WLAN configuration that uses automated security configuration to negotiate security parameters between a device and an access point. As depicted in FIG. 1, WLAN 50 includes two devices. A personal digital assistant ("PDA") 52 interfaces with a wireless access point 54 on the WLAN 50 over a wireless interface 56, and a laptop computer 58 interfaces with the access point 54 over the wireless interface 56.

While FIG. 1 depicts the PDA 52 and the laptop computer 58 interfacing with the access point 54 over the same wireless interface 56, it should be understood that the wireless interface 56 may operate using a variety of different methods. For example, the wireless interface 56 may use spread spectrum, whereby the PDA 52 and the laptop computer 58 may simultaneously communicate with the access point 54 over the same range of frequencies but using different spreading codes.

In another example, the wireless interface 56 may be divided into multiple sub-frequency ranges, and the PDA 52 and the laptop computer 58 may simultaneously communicate with the access point 54 using a different sub-frequency range. In another example, the PDA 52 and the laptop computer 58 may communicate with the access point 54 over the wireless interface 56 using the same frequency range but interleaving their signals in time, such as by using time division multiplexing. Of course, these are merely examples, and many other wireless communication methods may be used.

The WLAN may be any type of wireless network, such as an IEEE 802.11 network. Also, while FIG. 1 depicts a LAN, it should be understood that the exemplary embodiments are not limited to any particular size wireless network, but rather may be used with any size wireless network. Additionally, many different types of devices other than the laptop computer 58 and PDA 52 that are depicted in FIG. 1 may interface with the access point 54. For example, another type of computer, a mobile phone, a fax machine, a printer, a server or any other wireless device may also interface with the access point 54. These other devices may be used in place of or in addition to the PDA 52 and laptop computer 58. Also, a greater or fewer number of devices may interface with the access point 54.

The access point 54 in turn provides connectivity with the Internet 60. The access point 54 may additionally connect to one or more other networks, although none are shown in FIG. 1. These other networks may be in place of or in addition to the Internet 60. The WLAN 50 may also include more than one access point, thereby potentially extending the range of the WLAN 50.

Once connected to the WLAN 50, the PDA 52 and the laptop computer 58 may use the connectivity of the access point 54 to communicate with each other. Depending on the type of WLAN 50 and its particular configuration, the devices 52, 58 may communicate with each other directly, or they may communicate with each other through the access point 54. The devices 52, 58 may additionally communicate with another device having connectivity to the Internet 60 or with another device on another network having connectivity to the access point 54.

Figure 2A:
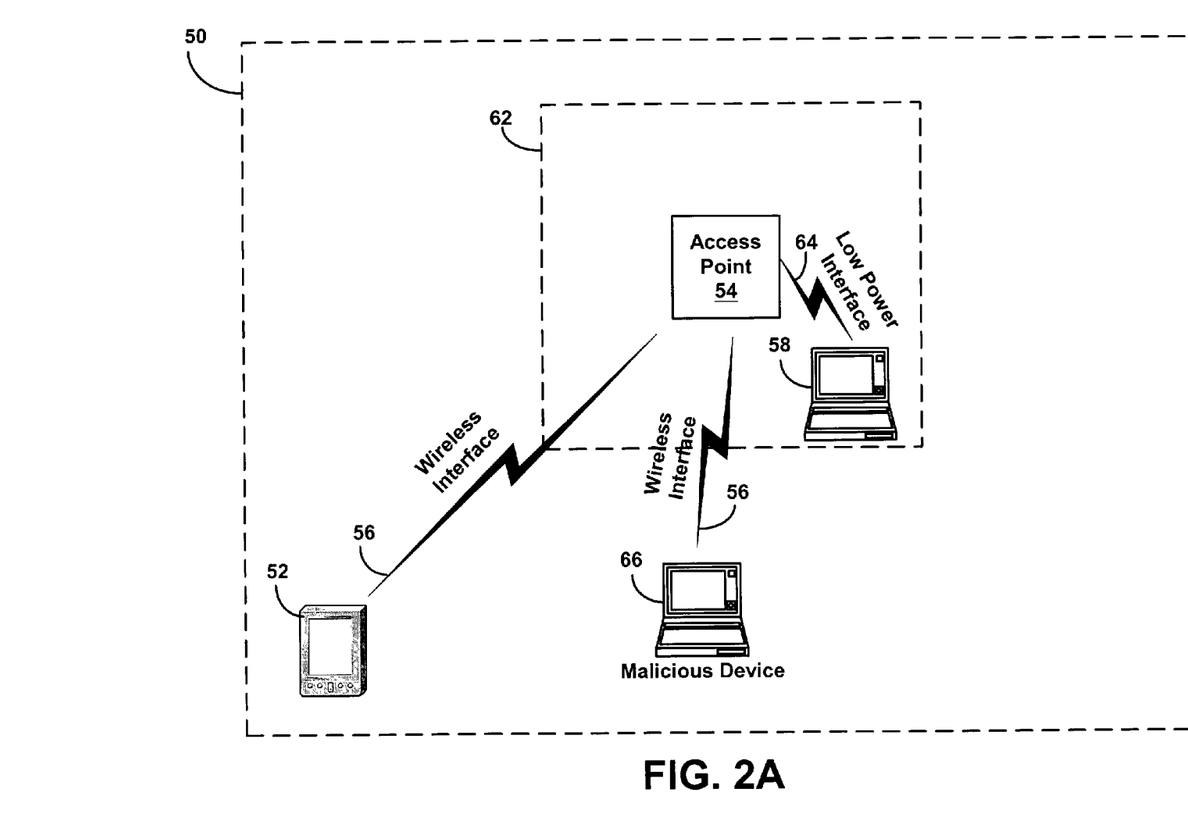
FIG. 2A is a block diagram of a laptop computer using automated security configuration to establish security parameters with an access point in the WLAN.

FIG. 2A is a block diagram of a laptop computer using automated security configuration to establish security parameters with an access point in the WLAN. As shown in FIG. 2, the WLAN 50 includes both the PDA 52, and the laptop computer 58. The PDA 52 communicates with the access point 54 over the wireless interface 56. The PDA 52 may communicate with the access point 54 from any location within the WLAN 50, whose boundary is indicated generally by dashed line 50.

The boundary of the WLAN 50 may depend on many different factors, such as the signal strengths of the WLAN and the PDA 52, obstructions within the WLAN 50 that may reduce the range of wireless signals sent between the access point 54 and the PDA 52, the addition or absence of other access points in the WLAN 50, and a variety of other factors. While FIG. 2A depicts the WLAN 50 having a well defined boundary, in practice, the boundary of the WLAN 50 will generally not be so well defined.

As shown in FIG. 2A, the laptop computer 58 communicates with the access point 54 using a low power interface 64. The low power interface 64 may be used to send low power signals between the laptop computer 58 and the access point 54 in order to allow the two devices 54, 58 to negotiate security parameters. The access point 54 and the laptop computer 58 may then use the security parameters for subsequent communications A low power region 62 surrounds the access point 54. The low power region 62 generally indicates the range of the low power signals sent over the low power interface 64. Thus, devices in the low power region 62 can generally detect the low power signals sent from the access point 54 while devices outside the lower power region 62 would not be able to detect the low power signals. Similarly, low power signals sent from devices in the low power region 62 may be detected by the access point 54, while other devices outside the low power region 62 may be unable to detect the low power signals.

As shown in FIG. 2A, the laptop computer 58 is within the low power range 62 and can communicate with the access point 54 using low power signals. As the malicious device 66 and the PDA 52 are located outside the low power range 62, they would not be able to receive packets sent between the laptop computer 58 and the access point 54 via the low power interface 64.

By communicating with each other using a low power interface 64, the access point 54 and the laptop computer 58 can significantly reduce the risk that the malicious device 66 may intercept the packets sent between the access point 54 and the laptop computer 58 when they negotiate the security parameters. If the malicious device 66 were to intercept these packets, the malicious device 66 may be able to extract the security parameters and later use the security parameters to intercept and read packets sent between the access point 54 and the laptop computer 58, thereby circumventing the security features used by the access point 54 and the laptop computer 58.

The low power signals sent over the low power interface 64 generally use a lower power than signals sent over the wireless interface 56. Thus, the low power signals sent over the low power interface 64 will generally have a smaller range than the signals sent over the wireless interface 56. The low power signals may have any range, and in an exemplary embodiment the low power signals have a range of less than approximately five feet. The range of the lower power signals will vary depending on the power used to transmit the low power signals, and in an exemplary embodiment the low power signals have a power of less than approximately 0.3 mW.

It should be understood, however, that the low power signals are not limited to any particular range or power. The access point 54 may purposefully extend or reduce the range signals transmitted over the low power interface 64, thereby also changing the boundaries of the low power region 62. For example, the access point 54 may increase the power of signals sent over the low power interface 64, thereby extending the range the signals and also the boundaries of the low power region 62. In another example, the access point 54 may decrease the power of signals sent over the low power interface 64, thereby decreasing the range of the signals and also the boundaries of the low power region 62.

Figure 2B:
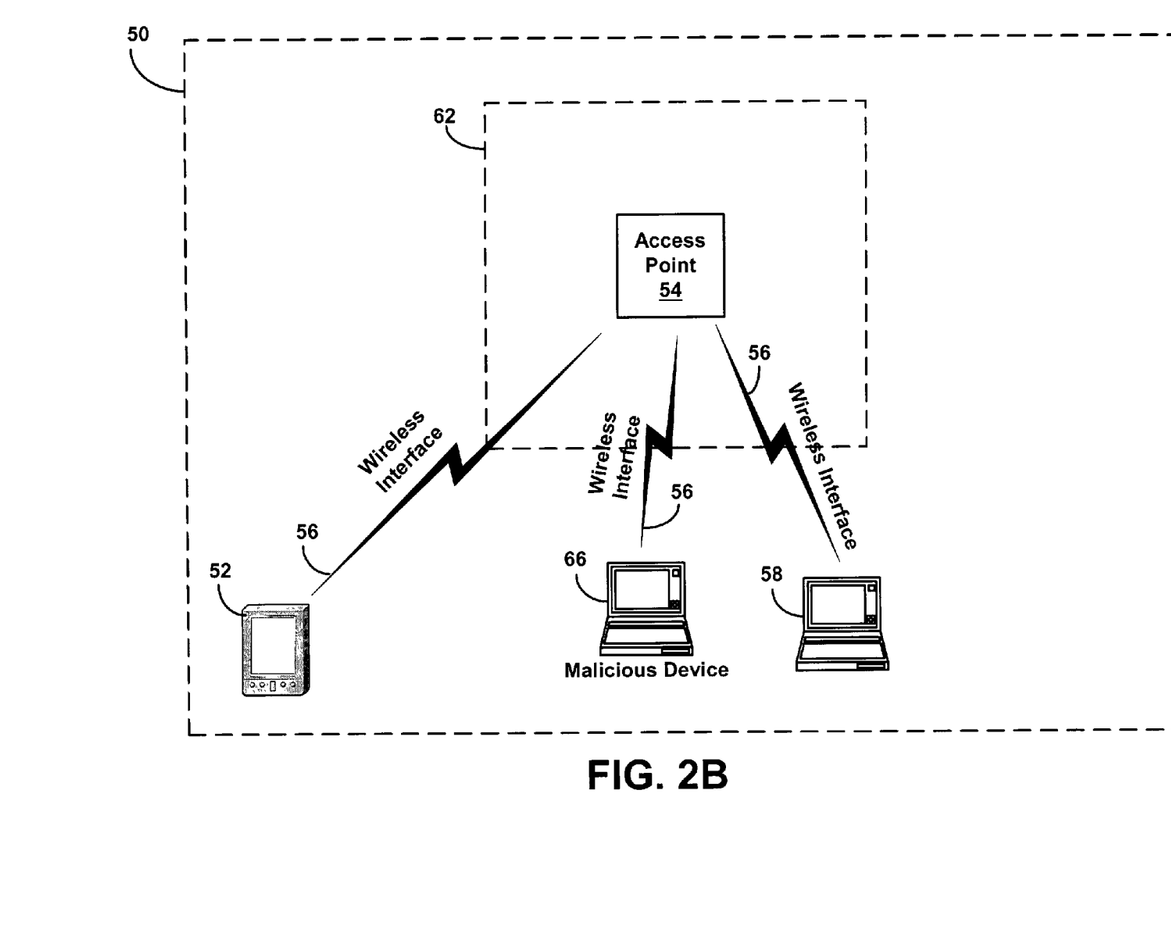
FIG. 2B is a block diagram of the laptop computer of FIG. 2A communicating with the access point after using automated security configuration to establish security parameters.

FIG. 2B is a block diagram of the laptop computer of FIG. 2A communicating with the access point after using automated security configuration to establish security parameters. As shown in FIG. 2B, the laptop computer 58 is now located outside the low power range 56, and it now communicates with the access point 54 over the wireless interface 56 using the security parameters previously negotiated with the access point 54. After negotiating security parameters, the laptop computer 58 may use the wireless interface 56 to communicate with the access point 54 from any location in the WLAN 50, including inside the low power region 62. Now, while the malicious device 66 may be located within the WLAN 50 and intercept communications between the access point 54 and the laptop computer 58 via the wireless interface 56, the malicious device 66 would not be able to obtain the underlying data from the packets because it would not know the security parameters previously negotiated by the access point 54 and the laptop computer 58.

Figure 3:
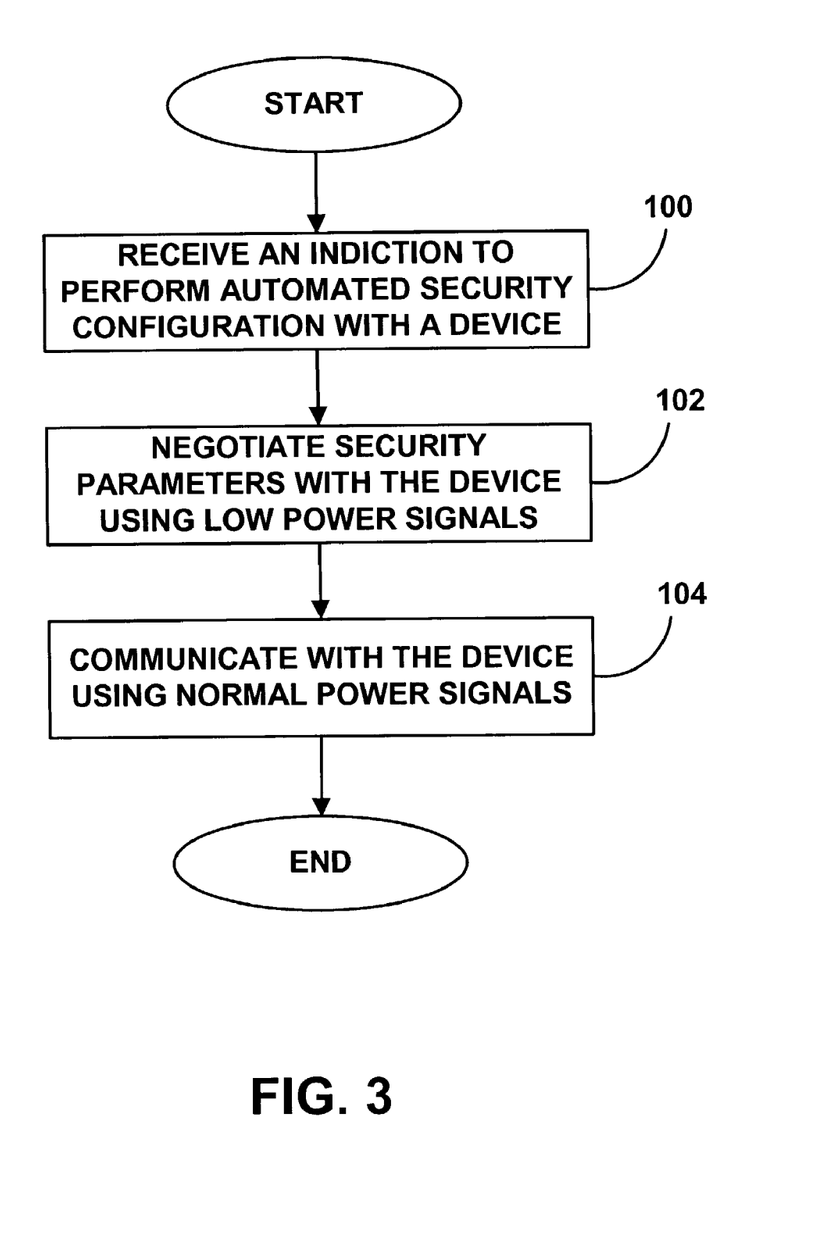
FIG. 3 is a flowchart of an exemplary process that an access point may use for automated security configuration.

FIG. 3 is a flowchart of an exemplary process that an access point may use for automated security configuration. At Step 100, the access point receives an indication to perform automated security configuration with a device. The indication may be any type of indication. For example, the access point may detect the push of a physical button on the access point. In another example, the indication may come from an input mechanism connected to the access point, such as a mouse, keyboard or keypad or other device. In yet another example, the indication may be the push of a soft button, such as on a touch screen for the access point. In another example, the indication may be a particular wireless signal from the device. Of course, this is not an exhaustive list, and many other types of indications may also be used.

The indication may be provided by any number of sources. In one embodiment, a user of the device provides the indication to the access point, such as by pressing a button on the access point. Thus, in order to provide this type of indication to use automated security configuration, the user would need physical access to the access point. By requiring the user to have physical access to the access point in order to start automated security configuration, the user would also at the same time bring the device close enough to communicate with the access point using the low power signals. This would help prevent a malicious device without physical access to the access point from initiating the automated security configuration and being authorized to join the WLAN.

In response, at Step 102, the access point negotiates security parameters with the device using low power signals. Thus, the user may bring the device close enough to the access point to communicate using the low power signals and then initiate the automated security configuration. In negotiating the security parameters, one or both of the device and the access point may use low power signals. For example, the access point may transmit low power signals to the device, and/or the device may transmit low power signals to the access point.

After agreeing on one or more security parameters, the access point may automatically configure itself to use the security parameters when communicating with the device. For example, if the access point and the device agreed on a particular type of encryption and a particular encryption key, then the access point may modify its configuration to use the agreed encryption type and key when communicating with the device. Similarly, if the access point received a MAC address for the device, such as to use in an access control list, then the access point may update its access control list to include the MAC address for the device. These updates may be performed automatically, such as without user intervention, thereby greatly reducing the complexity of the configuration process.

After negotiating the security parameters, the access point communicates with the device using normal power signals, as shown at Step 104. This allows the device to communicate with the access point from any location within the access point's coverage in the WLAN. The device and the access point communicate using the negotiated security parameters. Although any other device in range of the access point can intercept the normal power signals sent between the device and the access point, the other device would not have the security parameters necessary to obtain the underlying data in the signals.

In one embodiment, after the device and the access point negotiate security parameters and after the access point subsequently recognizes the newly configured device, the access point may display an indication that the access point now recognizes the device. For example, the access point may display a numeric identifier on the access point, and the numeric identifier may display the total number of devices currently connected to the access point. Thus, when the newly configured device connects with the access point, the access point may increment the identifier, thereby allowing the device's user to see that the device successfully connected to the access point.

The numeric identifier may be, for example, a number displayed on the access point. When a device connects to the access point, the access point may increment the number by one. In another example, the access point may display a number of LEDs or other similar indicators. Each time a device successfully connects to the access point, the access point may light an additional LED, thereby providing a display of the number of connected devices. Of course, other methods of indicating the number of connected devices may also be used.

Displaying the number of connected devices allows a user to conveniently tell whether the automated security configuration process was successful. For example, if the automated security configuration process was successfully completed, the user would then see the access point update its display of the total number of connected devices to include the new device. Displaying the number of connected devices also allows easier detection of unauthorized users, such as by more easily viewing the total number of connected devices using the access point's display. Thus, the user can more easily monitor the access point to determine when a device connects to the access point.

Figure 4:
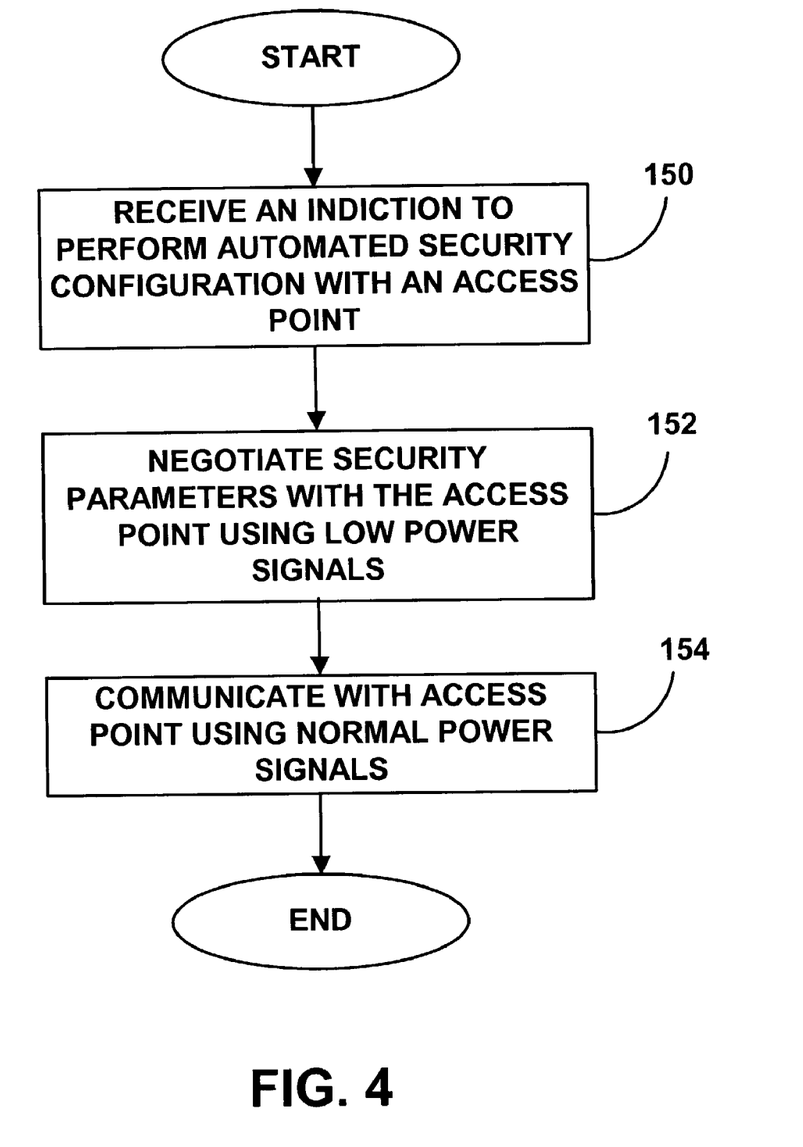
FIG. 4 is a flowchart of an exemplary process that a device may use for automated security configuration.

FIG. 4 is a flowchart of an exemplary process that a device may use for automated security configuration. At Step 150, the device receives an indication to perform automated security configuration with an access point. As previously described, the indication may be a push of a hard or soft button, a signal from another input device, or another type of indication. The device may receive its indication to use automated security configuration at approximately the same time as the access point receives its indication to use automated security configuration. For example, a user may provide an indication to both the access point and the device by simultaneously pressing a button on both the access point and the device.

In response to the indication, the device negotiates security parameters with the access point using low power signals, as shown at Step 152. As part of negotiating the security parameters, the device may automatically update its configuration to use the security parameters when communicating with the access point. Then, at Step 154, the device communicates with the access point using normal power signals, thereby allowing the device to communicate with the access point from any location in the WLAN. The device and the access point may securely communicate with each other using the negotiated security parameters, thereby preventing a malicious device from decoding intercepted signals sent between the access point and the device.

As previously described, automated security configuration may be used with a variety of different types of wireless networks, such as an IEEE 802.11 network. In an 802.11 network, a service set identifier ("SSID") differentiates different 802.11 WLANs. Thus, each 802.11 WLAN may use a unique SSID to differentiate itself from other 802.11 WLANs. A device or access point generally must provide the SSID in order to join as a member of the 802.11 WLAN. Also, each device and access point on a WLAN attaches the SSID to packets headers sent over the 802.11 WLAN, thereby identifying the packets as sent from a member of the 802.11 WLAN. As the SSID is simply attached to header of packets traveling over the 802.11 WLAN, it generally does not provide any security to the 802.11 WLAN, because a malicious device can simply determine the SSID by intercepting a packet and extracting the SSID from the packet's header.

However, the SSID may be used in conjunction with other security techniques that provide security for the underlying data carried in packets sent between a device and the access point. For example, the device and the access point may use encryption, Internet Protocol security ("IPSec") or other methods to protect the underlying data. Thus, a malicious device that was not privy to the negotiated security parameters would not be able to intercept packets traveling between the device and the access point and decode the underlying data. Further, although the malicious device may obtain the SSID used by the access point, it would not be able to communicate with the access point using the encryption, IPSec or other methods because it was not privy to the negotiated security parameters. Thus, it would be unable to connect to the WLAN through the access point even if it were to obtain the access point's SSID. Other methods, such as access control lists, may also be used to prevent a malicious device that knows an access point's SSID from connecting to a WLAN through the access point.

While a typical 802.11 network only uses one SSID, an 802.11 WLAN implementing automated security configuration may use two different SSIDs. A configuration SSID may be pushed from the access point to the device upon initiating the automated security configuration process. The configuration SSID may be broadcast to the device at low power, thereby preventing other devices that are out of range of the access point's low power signals from intercepting and determining the configuration SSID. The access point and the device then use the configuration SSID when the exchange packets to negotiate security parameters. As part of the negotiating process, the access point may provide the device with an operating SSID, which may be used for communication between the access point and the device after they negotiate the security parameters. It is also possible, however, that an 802.11 WLAN implementing automated security configuration only uses a single SSID or uses more than two SSIDs.

Figure 5:
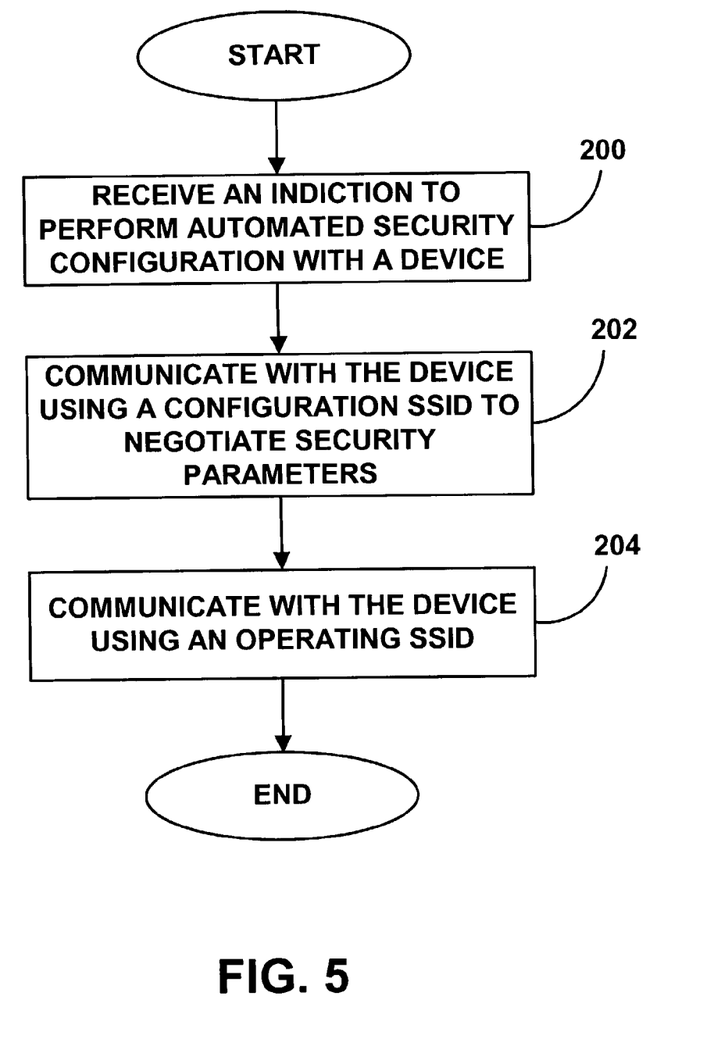
FIG. 5 is a flowchart of an exemplary process that an access point in an 802.11 network may use for automated security configuration.

FIG. 5 is a flowchart of an exemplary process that an access point in an 802.11 network may use for automated security configuration. The access point first receives an indication to perform automated security configuration with a device, as shown at Step 200. Then, the access point communicates with the device using a configuration service set identifier to negotiate security parameters, as shown at Step 202. Next, at Step 204, the access point communicates with the device using an operating SSID. The operating SSID may be provided to the device when it negotiates the security parameters. After negotiating the security parameters using the configuration SSID, the device may switch to communicating with the access point using the operating SSID. The operating SSID may be used in conjunction with other security parameters, such as encryption, IPSec or other methods, in order to protect the underlying data for the packets.

Figure 6:
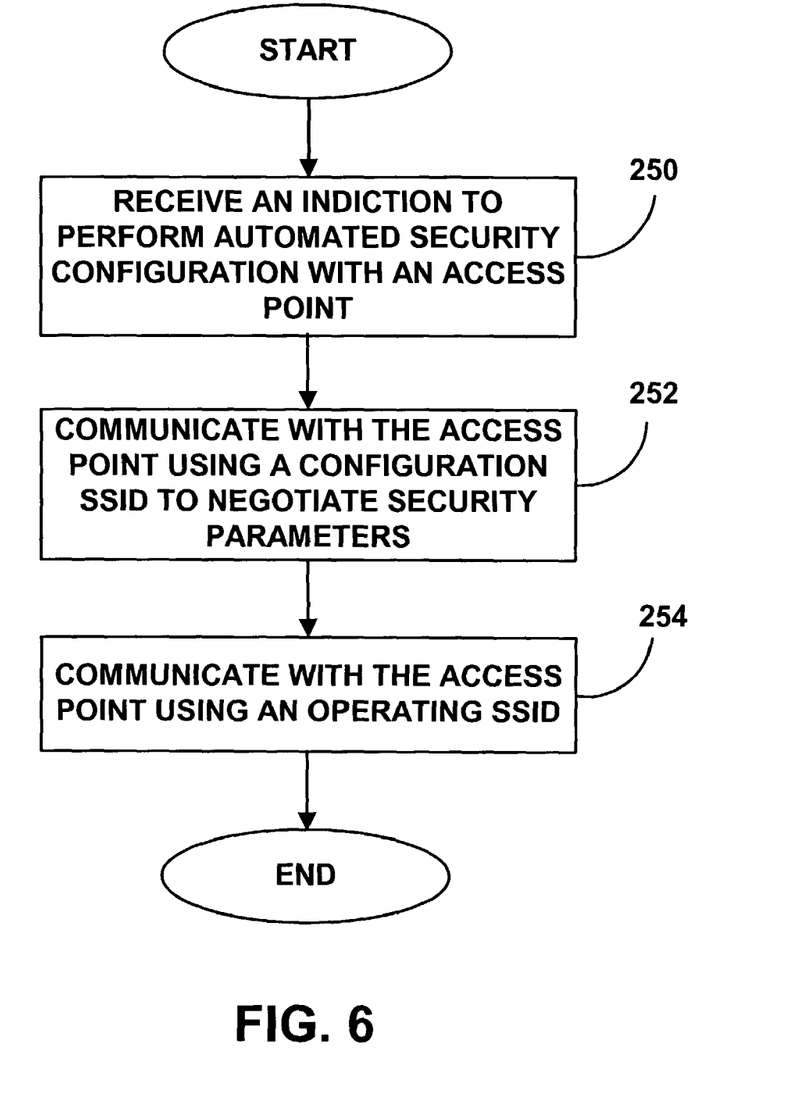
FIG. 6 is a flowchart of an exemplary process that a wireless device in an 802.11 network may use for automated security configuration.

FIG. 6 is a flowchart of an exemplary process that a wireless device in an 802.11 network may use for automated security configuration. At Step 250, the device receives an indication to perform automated security configuration with an access point. Then, at Step 252, the device communicates with the access point using a configuration SSID to negotiate security parameters. At Step 254, the device communicates with the access point using an operating SSID, which may have been provided to it when negotiating security parameters with the access point.

Figure 7:
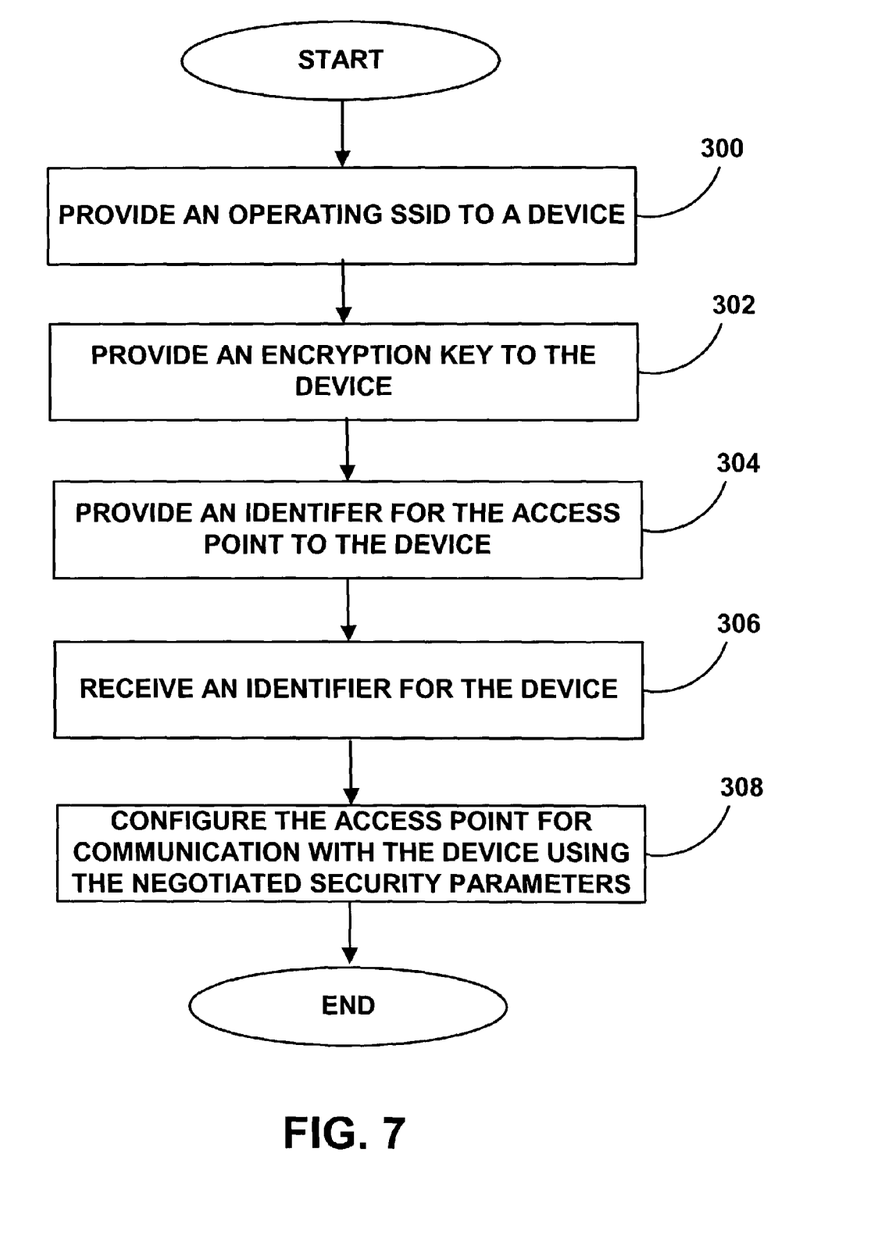
FIG. 7 is a flowchart of an exemplary process that an access point in an 802.11 network may use to negotiate security parameters with a device.

FIG. 7 is a flowchart of an exemplary process that an access point in an 802.11 network may use to negotiate security parameters with a device. At Step 300, the access point provides an operating SSID to the device. At Step 302, the access point provides an encryption key to the device. The encryption key may be for any type of encryption, for example, wired equivalent privacy ("WEP") encryption. At Step 304, the access point provides an identifier for the access point to the device. For example, the access point may provide the device with the access point's MAC address, IP address, name, SSID or some combination of these or other identifiers. Then, at Step 306, the access point receives an identifier for the device. The identifier may be a MAC address, an IP address or another identifier. At Step 308, the access point configures itself for communication with the devices using the negotiated security parameters.

Various changes may be made to the flowchart depicted in FIG. 7. For example, the steps may be performed in a variety of different orders, additional steps may be added, or one or more of the steps may be eliminated. For example, if the access point and the device do not use encryption, then Step 302 may be eliminated. In another example, if the access point and the device do not both need to exchange identifiers, then one or both of Steps 304 and 306 may be eliminated. In yet another example, the access point may periodically refresh the device's encryption key, such as by providing it with a different encryption key, and the device may automatically update its configuration to use the newly provided encryption key. These are merely examples, and other modifications may also be made.

Figure 8:
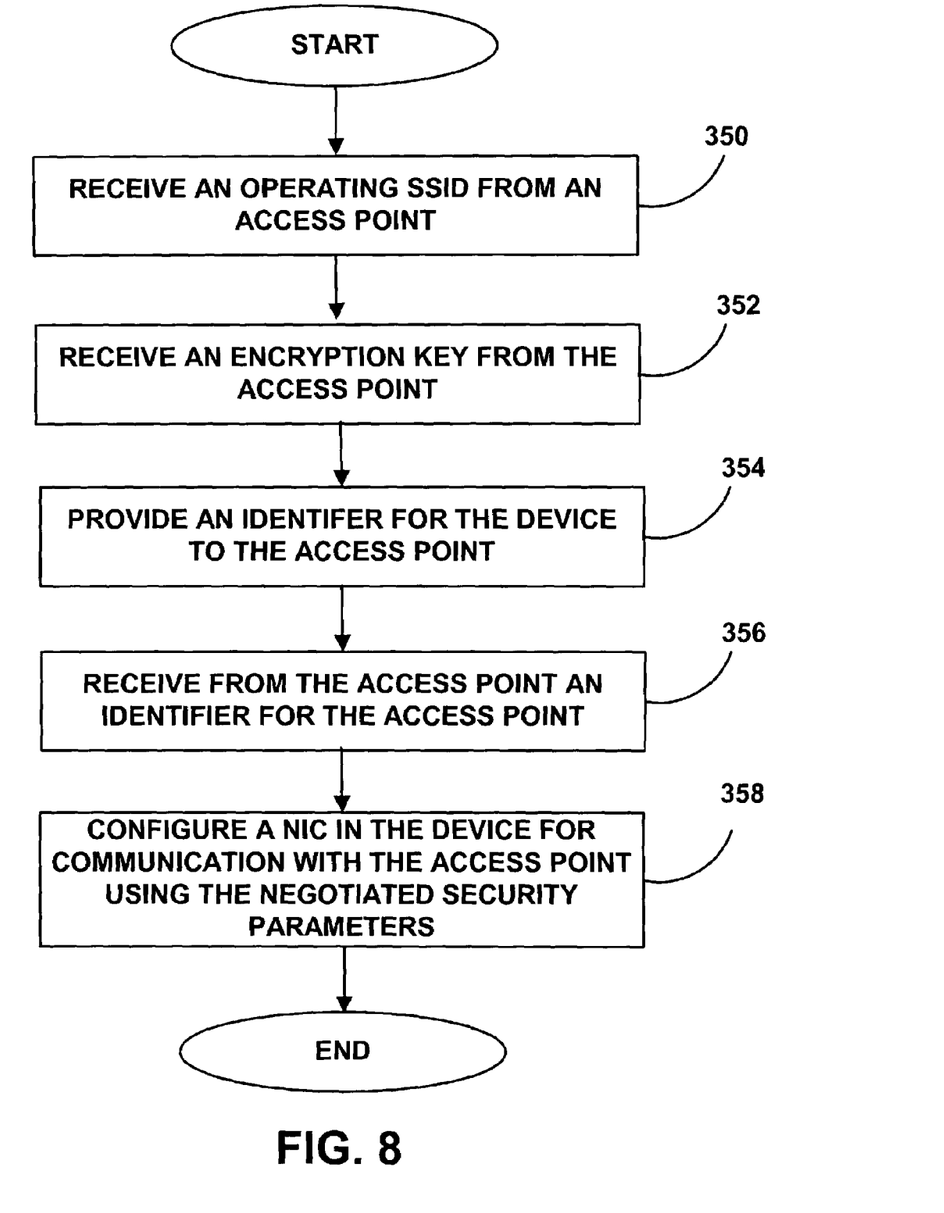
FIG. 8 is a flowchart of an exemplary process that a device in an 802.11 network may use to negotiate security parameters with an access point.

FIG. 8 is a flowchart of an exemplary process that a device in an 802.11 network may use to negotiate security parameters with an access point. At Step 350, the device receives an operating SSID from the access point. At Step 352, the device receives an encryption key from the access point. At Step 354, the device provides an identifier for the device to the access point. At Step 356, the device receives from the access point an identifier for the access point. At Step 358, the device configures a network interface card ("NIC") in the device for communication with the access point using the negotiated security parameters.

Many different variations may be made to the process depicted in FIG. 8. For example, the steps may be performed in a different order. In another example, additional steps may be added, such as if the access point and the device use other security parameters. In yet another example, one or more steps may be eliminated, such as if the access point and the device do not use all of the security parameters described with respect to FIG. 8. Other modifications may also be made.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not necessarily be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for negotiating security parameters in a wireless network, the method comprising:
   detecting an indication to negotiate security parameters with a device;
   using signals having a first power level to negotiate security parameters with the device; and
   subsequently communicating with the device using signals having a second power level, wherein the second power level is greater than the first power level.

2. A computer readable medium having stored therein instructions for causing a central processing unit to execute the method of claim 1.

3. The method of claim 1, wherein detecting an indication comprises detecting an indication from a button.

4. The method of claim 1, wherein the indication occurs simultaneously with an indication on the device to negotiate security parameters.

5. The method of claim 1, wherein negotiating security parameters comprises providing an encryption key to the device.

6. The method of claim 1, wherein the wireless network is an 802.11 network, and wherein negotiating security parameters comprises:
   providing a configuration service set identifier to the device; and
   using the configuration service set identifier to communicate with the device while negotiating the security parameters.

7. The method of claim 6, further comprising:
   providing an operating service set identifier to the device; and after negotiating the security parameters with the device, using the operating service set identifier to communicate with the device.

8. The method of claim 1, wherein negotiating security parameters comprises:
receiving a MAC address for the device; and
storing the MAC address for the device in an access control list.

9. The method of claim 1, wherein negotiating security parameters comprises establishing a virtual private network tunnel with the device, wherein the virtual private network tunnel uses IPsec.

10. The method of claim 1, wherein the first power level is less than approximately 0.3 mW.

11. A method for an access point negotiating security parameters with a device on a wireless local area network, the method comprising:
using wireless signals having a first range to negotiate security parameters with the device; and
after negotiating the security parameters with the device, communicating with the device using signals having a second range, wherein the second range is greater than the first range.

12. A computer readable medium having stored therein instructions for causing a central processing unit to execute the method of claim 11.

13. The method of claim 11, wherein using signals having a first range comprises sending to the device signals having the first range.

14. The method of claim 11, wherein using signals having a first range comprises receiving from the device signals having the first range.

15. The method of claim 11, wherein the wireless local area network is an 802.11 network, and wherein negotiating security parameters comprises providing a service set identifier to the device.

16. The method of claim 11, wherein the first range is less than approximately five feet.

17. The method of claim 11, further comprising displaying on an access point an indication that the device has successfully negotiated the security parameters with the access point and has connected to the access point.

18. A method for negotiating security parameters in a wireless network, the method comprising:
detecting an indication to negotiate security parameters with an access point for the wireless network,
using signals having a first power level to negotiate security parameters with the access point, and
subsequently communicating with the access point using signals having a second power level, wherein the second power level is greater than the first power level.

19. A computer readable medium having stored therein instructions for causing a central processing unit to execute the method of claim 18.

20. The method of claim 18, wherein detecting an indication comprises detecting an indication from a button.

21. The method of claim 18, wherein the indication occurs simultaneously with an indication on the device to negotiate security parameters.

22. The method of claim 18, wherein negotiating security parameters comprises receiving an encryption key from the access point.

23. The method of claim 18, wherein the wireless network is an 802.11 network, and wherein negotiating the security parameters comprises receiving an operating service set identifier from the access point.

24. The method of claim 23, further comprising receiving a configuration service set identifier, wherein the device uses the configuration service set identifier while negotiating the security parameters with the access point.

25. The method of claim 18, wherein the first power level is less than approximately 0.3 mW.

26. A method for a device negotiating security parameters with an access point on a wireless local area network, the method comprising:
using signals having a first range to negotiate security parameters with the access point; and
after negotiating the security parameters with the access point, communicating with the access point using signals having a second range, wherein the second range is greater than the first range.

27. A computer readable medium having stored therein instructions for causing a central processing unit to execute the method of claim 26.

28. The method of claim 26, wherein using signals having a first range comprises sending to the access point signals having the first range.

29. The method of claim 26, wherein using signals having a first range comprises receiving from the access point signals having the first range.

30. The method of claim 26, wherein negotiating security parameters comprises receiving an encryption key from the access point.

31. The method of claim 26, wherein the wireless local area network is an 802.11 network, and wherein negotiating security parameter comprises receiving a service set identifier from the access point.

32. The method of claim 26, wherein the first range is less than approximately five feet.

* * * * *